(12) United States Patent
Nishihara

(10) Patent No.: US 8,319,850 B2
(45) Date of Patent: Nov. 27, 2012

(54) IMAGING ELEMENT WITH SIGNAL HOLDING SECTION, DRIVE METHOD FOR IMAGING ELEMENT WITH SIGNAL HOLDING PERIOD, AND CAMERA WITH IMAGING ELEMENT AND SIGNAL HOLDING SECTION

(75) Inventor: Toshiyuki Nishihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 470 days.

(21) Appl. No.: 12/607,194

(22) Filed: Oct. 28, 2009

(65) Prior Publication Data
US 2010/0110216 A1 May 6, 2010

(30) Foreign Application Priority Data
Nov. 5, 2008 (JP) .................................. 2008-283966

(51) Int. Cl.
H04N 5/228 (2006.01)
H04N 3/14 (2006.01)
H04N 5/335 (2011.01)
(52) U.S. Cl. ..................................... 348/222.1; 348/294
(58) Field of Classification Search .......................... None
See application file for complete search history.

(56) References Cited

U.S. PATENT DOCUMENTS
6,839,452 B1 * 1/2005 Yang et al. .................... 382/103
2008/0309810 A1 * 12/2008 Smith et al. ................... 348/319

FOREIGN PATENT DOCUMENTS
JP 2005-278135 10/2005

* cited by examiner

Primary Examiner — Justin P Misleh
(74) Attorney, Agent, or Firm — SNR Denton US LLP

(57) ABSTRACT

An imaging element includes: a pixel section in which a plurality of pixels each having a photoelectric conversion element are arranged in a matrix; a signal line to which a signal read from the pixels is transmitted; a holding section for holding the read signal during a holding period; a processing section for performing signal processing on the read signal after being held by the holding section; and a control section for controlling supply of the read signal to the holding section. The control section supplies the read signal to the holding section to cause it to hold the read signal during the holding period, and stops supplying the read signal to the holding section to cause the processing section to perform the signal processing on the read signal and to cause a signal to be read from the pixels and output to the signal line after the holding.

13 Claims, 13 Drawing Sheets

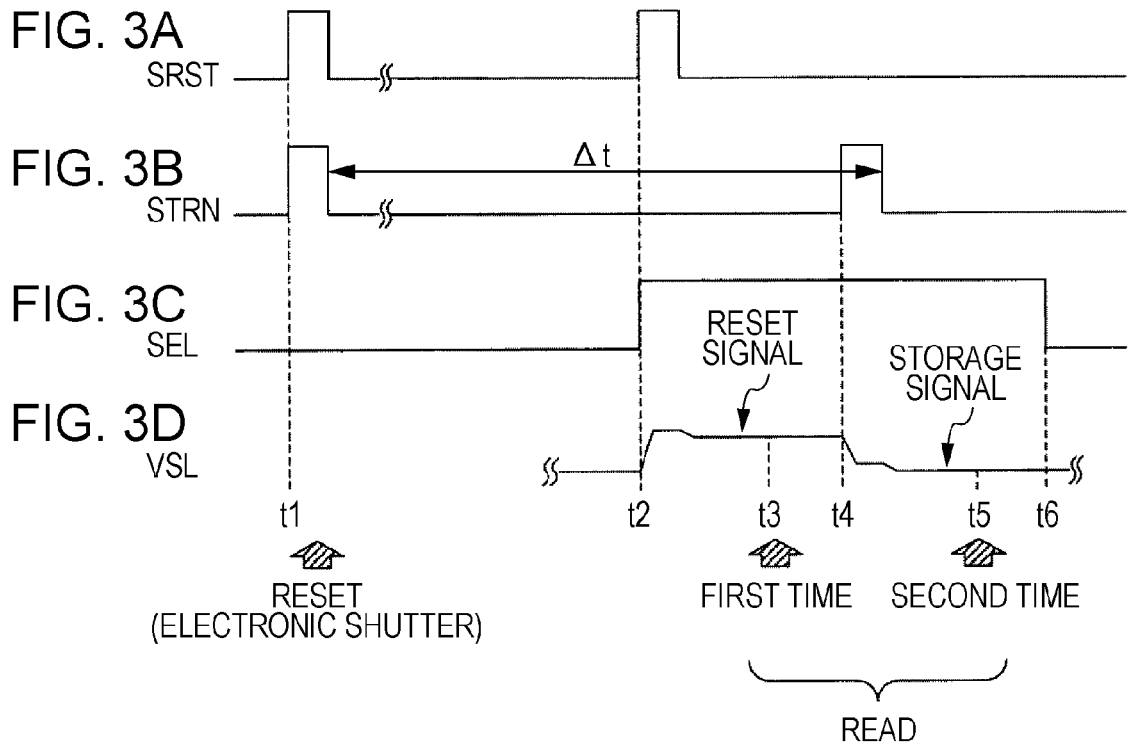
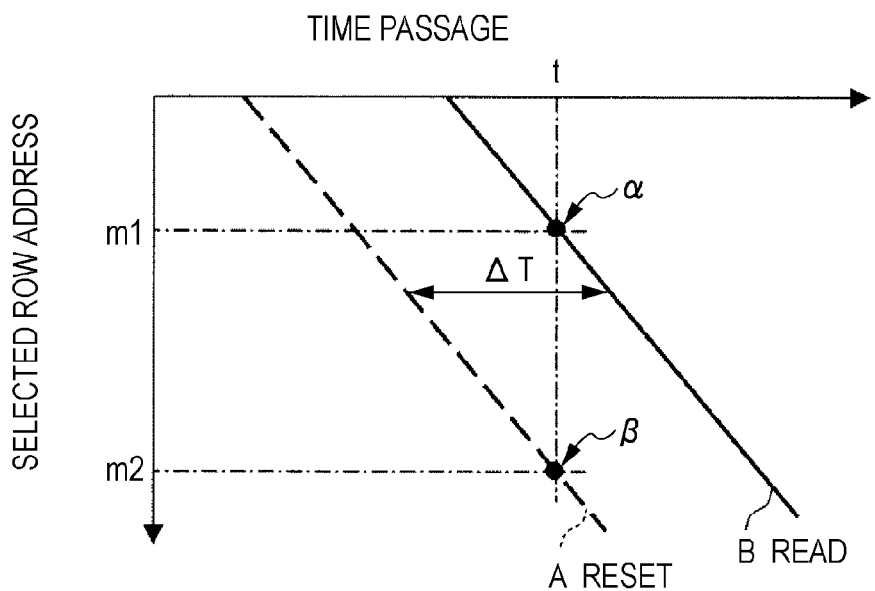

IMAGING ELEMENT WITH SIGNAL HOLDING SECTION, DRIVE METHOD FOR IMAGING ELEMENT WITH SIGNAL HOLDING PERIOD, AND CAMERA WITH IMAGING ELEMENT AND SIGNAL HOLDING SECTION

BACKGROUND OF THE INVENTION

1. Field of the Invention

The present invention relates to an imaging element such as a CMOS (Complementary Metal Oxide Semiconductor) image sensor, a drive method for an imaging element, and a camera.

2. Description of the Related Art

Cameras equipped with an imaging element such as a CMOS image sensor are widely available in the market (see Japanese Unexamined Patent Application Publication No. 2005-278135 (JP-A-2005-278135)). In recent years, a higher pixel resolution and a higher frame rate have been desired.

SUMMARY OF THE INVENTION

In an imaging element, a column processing circuit reads an analog signal from a pixel circuit, and converts the analog signal into a digital signal. The analog signal output from the pixel circuit is input to the column processing circuit via a vertical signal line.

When the column processing circuit reads the analog signal, a signal delay may be caused by the transmission of the analog signal to the vertical signal line. The signal delay may hinder the achievement of a higher pixel resolution and a higher frame rate.

According to the technique disclosed in JP-A-2005-278135, it is difficult to achieve a higher pixel resolution and a higher frame rate because of the signal delay discussed above.

It is therefore desirable to provide an imaging element, a drive method for an imaging element, and a camera capable of achieving a higher pixel resolution and a higher frame rate.

According to an embodiment of the present invention, there is provided an imaging element including: a pixel section in which a plurality of pixels each having a photoelectric conversion element are arranged in a matrix; a signal line to which a signal read from the pixels is transmitted; a holding section configured to hold the read signal in the signal line during a holding period; a processing section configured to perform signal processing on the read signal after being held by the holding section; and a control section configured to control supply of the read signal transmitted to the signal line to the holding section. The control section is configured to supply the read signal transmitted to the signal line to the holding section to cause the holding section to hold the read signal during the holding period, and stop supplying the read signal in the signal line to the holding section to cause the processing section to perform the signal processing on the read signal and to cause a signal to be read from the pixels and output to the signal line after the holding.

According to an embodiment of the present invention, there is provided a drive method for an imaging element including the steps of: reading a signal from pixels of a pixel section, the pixels being arranged in a matrix and each having a photoelectric conversion element; supplying the signal read from the pixels to a holding section through a signal line, the holding section being configured to hold the read signal during a holding period; holding the read signal during the holding period; stopping supply of the read signal in the signal line to the holding section; and performing signal processing on the read signal after being held by the holding section and reading a signal from the pixels.

According to an embodiment of the present invention, there is provided a camera including: an imaging element; an optical system configured to introduce incident light to a pixel region of the imaging element; and a signal processing section configured to process a signal output from the imaging element, the imaging element device including: a pixel section in which a plurality of pixels each having a photoelectric conversion element are arranged in a matrix; a signal line to which a signal read from the pixels is transmitted; a holding section configured to hold the read signal in the signal line during a holding period; a processing section configured to perform signal processing on the read signal after being held by the holding section; and a control section configured to control supply of the read signal transmitted to the signal line to the holding section. The control section is configured to supply the read signal transmitted to the signal line to the holding section to cause the holding section to hold the read signal during the holding period, and stop supplying the read signal in the signal line to the holding section to cause the processing section to perform the signal processing on the read signal and to cause a signal to be read from the pixels and output to the signal line after the holding.

According to the embodiments of the present invention, a signal is read from the pixels of the pixel section, the pixels being arranged in a matrix and each having a photoelectric conversion element.

The control section supplies the signal read from the pixels and transmitted to the signal line to the holding section. The holding section holds the read signal in the signal line during a holding period.

After the holding, the control section stops supplying the read signal in the signal line to the holding section. The control section causes the processing section to perform signal processing on the read signal held by the holding section, and causes a signal to be read from the pixels and output to the signal line.

According to the present invention, it is possible to achieve a higher pixel resolution and a higher frame rate.

BRIEF DESCRIPTION OF THE DRAWINGS

FIG. 3A is a timing chart showing an exemplary method for driving the pixel circuit according to the first embodiment of the present invention, showing a reset signal SRST;

FIG. 3B is a timing chart showing an exemplary method for driving the pixel circuit according to the first embodiment of the present invention, showing a transfer signal STRN;

FIG. 3C is a timing chart showing an exemplary method for driving the pixel circuit according to the first embodiment of the present invention, showing a selection signal SEL;

FIG. 3D is a timing chart showing an exemplary method for driving the pixel circuit according to the first embodiment of the present invention, showing an analog signal voltage VSL;

FIG. 4 illustrates the concept of an exemplary rolling shutter according to the first embodiment of the present invention;

DESCRIPTION OF THE PREFERRED EMBODIMENTS

An embodiment of the present invention will be described below with reference to the drawings. The description will be made in the following order.

1. First Embodiment (CMOS Image Sensor)
2. Second Embodiment (Comparison between CMOS Image Sensors)
3. Third Embodiment (Camera)

<1. First Embodiment>

[Exemplary Configuration of CMOS Image Sensor 1]

An exemplary configuration of a CMOS image sensor is described with reference to FIG. 1.

Figure 1:
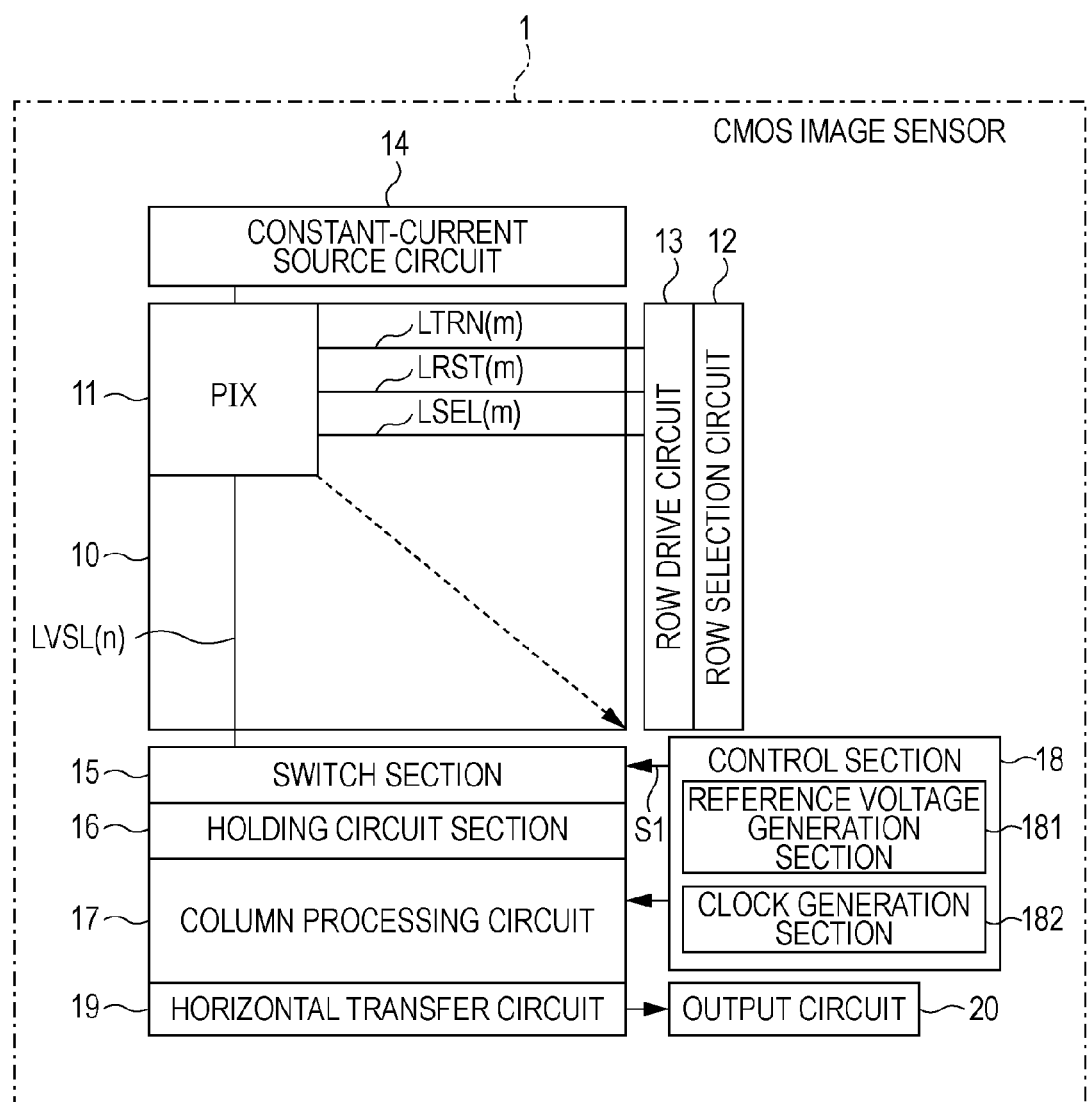
FIG. 1 is a schematic block diagram showing an exemplary configuration of a CMOS image sensor according to a first embodiment of the present invention.

FIG. 1 is a schematic block diagram showing an exemplary configuration of a CMOS image sensor according to a first embodiment of the present invention.

As shown in FIG. 1, a CMOS image sensor 1 includes a pixel section 10, a pixel circuit (PIX) 11, a row selection circuit 12, a row drive circuit 13, a constant-current source circuit 14, a switch section 15, a holding circuit section 16, a column processing circuit 17, a control section 18, a horizontal transfer circuit 19, and an output circuit 20.

The CMOS image sensor 1 corresponds to an imaging element according to the present invention. The pixel circuit 11 corresponds to pixels according to the present invention. The row selection circuit 12 and the row drive circuit 13 correspond to a drive section according to the present invention. The column processing circuit 17 corresponds to a processing section according to the present invention. The row selection circuit 12, the row drive circuit 13, and the control section 18 correspond to a control section according to the present invention. The holding circuit section 16 corresponds to a holding section according to the present invention.

The pixel section 10 is a pixel region for receiving incident light, and includes a plurality of pixel circuits 11 arranged in a matrix of m rows by n columns. In FIG. 1, only the pixel circuit 11 in the m-th row (m=1, 2, . . . ) and the n-th column (n=1, 2, . . . ) is shown.

According to the present invention, it is possible to achieve a higher pixel resolution and a higher frame rate.

The pixel circuits 11 are covered with color filters for R (red), G (green), and B (blue) in a Bayer arrangement, for example.

The pixel circuits 11 in the same row are commonly connected to a transfer signal line LTRN(m), a reset signal line LRST(m), and a selection signal line LSEL(m).

The pixel circuits 11 convert the incident light into signal charge (electrons) through photoelectric conversion to output an analog signal (read signal) corresponding to the amount of the charge to a vertical signal line LVSL(n) under control performed by the row drive circuit 13.

The row selection circuit 12 outputs a row selection signal to the row drive circuit 13 to select a row address of the pixel section 10.

The row drive circuit 13 receives the row selection signal from the row selection circuit 12 to drive the pixel circuits 11 in the selected row (m-th row).

The constant-current source circuit 14 supplies a constant current to the vertical signal line LVSL(n).

The switch section 15 has a connection switch for each column address. Each connection switch of the switch section 15 is turned on or off on the basis of a control signal S1 from the control section 18. When each connection switch of the switch section 15 is turned on, the analog signal transmitted to the vertical signal line LVSL(n) is supplied to the holding circuit section 16.

The holding circuit section 16 receives the analog signal transmitted to the vertical signal line LVSL(n) as an input to hold the analog signal when each connection switch of the switch section 15 is turned on.

The column processing circuit 17 reads the analog signal from the pixel circuit 11 in the selected row for each column (column address) to convert the analog signal into a digital signal. Such conversion of an analog signal into a digital signal is referred to as "AD conversion".

The column processing circuit 17 reads the analog signal from the pixel circuits 11 in the selected line twice during one pixel period in one horizontal scanning period (horizontal blanking period). The column processing circuit 17 then applies a CDS (Correlated Double Sampling) process on the analog signal to remove reset noise, for example.

Thereafter, the column processing circuit 17 outputs the digital signal to the output circuit 20 via the horizontal transfer circuit 19.

The control section 18 includes a reference voltage generation section 181 and a clock generation section 182.

The reference voltage generation section 181 is formed by a DAC (Digital Analog Converter, not shown) for converting a digital signal into an analog signal, for example.

The control section 18 generates a reference voltage in a RAMP waveform in the reference voltage generation section 181 to supply the reference voltage to the column processing circuit 17.

The control section 18 generates a clock signal in the clock generation section 182 to supply the clock signal to the column processing circuit 17.

The control section 18 outputs a control signal S1 for turning on or off each connection switch of the switch section 15 to each connection switch of the switch section 15.

The horizontal transfer circuit 19 selects column addresses sequentially to read the digital signals from the column processing circuit 17. The horizontal transfer circuit 19 then outputs the sequentially read digital signals to the output circuit 20.

The output circuit 20 amplifies the digital signals input from the horizontal transfer circuit 19 to output the digital signals as image data to an image processing apparatus outside the CMOS image sensor 1.

The output circuit 20 may apply signal processing such as gain adjustment, color correction, and white balance processing, for example, to the digital signal.

[Exemplary Configuration of Pixel Circuit 11]

An exemplary configuration of the pixel circuit 11 is described with reference to FIG. 2.

Figure 2:
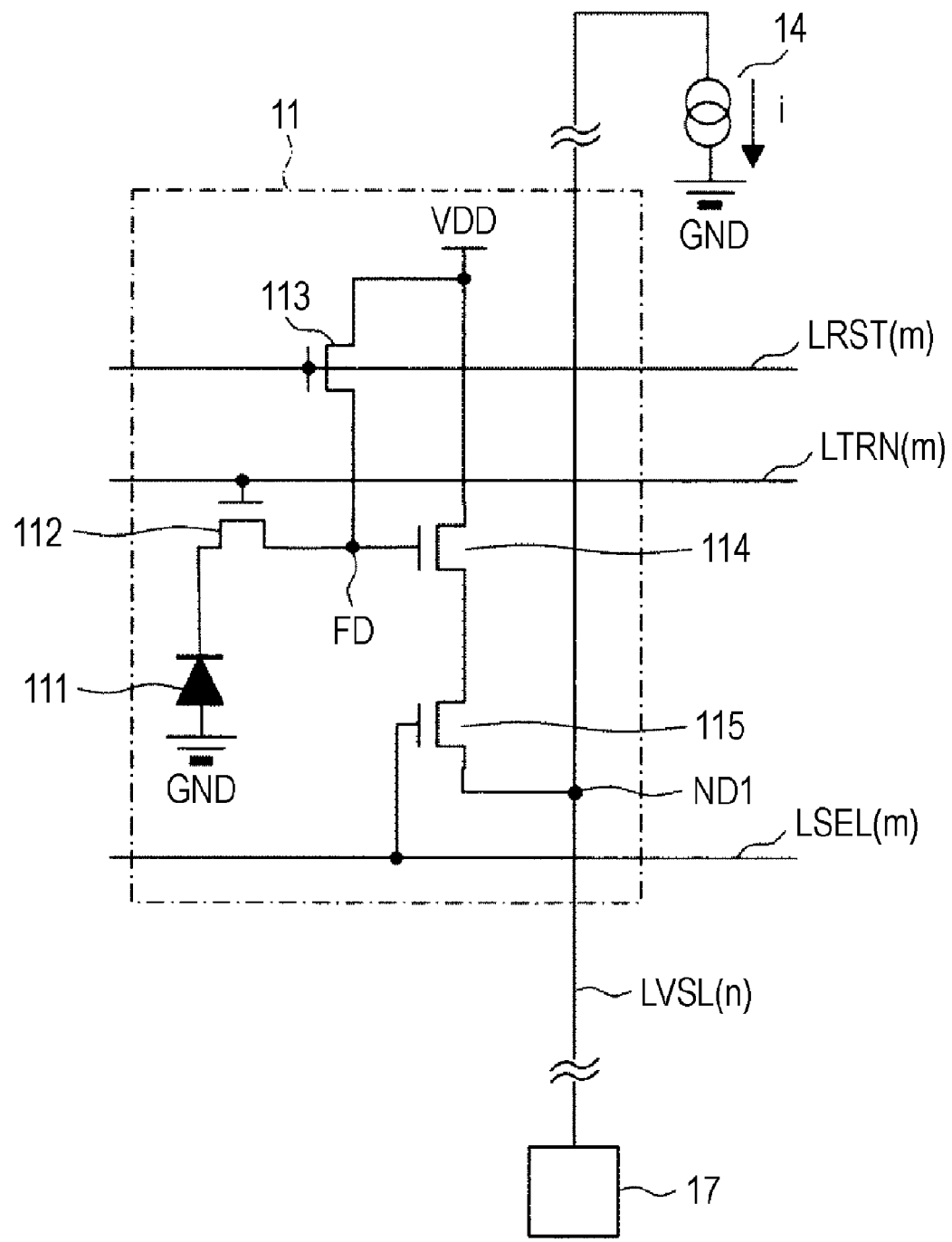
FIG. 2 is an equivalent circuit diagram showing an exemplary configuration of a pixel circuit according to the first embodiment of the present invention.

FIG. 2 is an equivalent circuit diagram showing an exemplary configuration of a pixel circuit according to the first embodiment of the present invention.

In FIG. 2, the pixel circuit 11 in the m-th row and the n-th column is illustrated.

As shown in FIG. 2, the pixel circuit 11 includes a photoelectric conversion element 111 formed by a photodiode, for example, a transfer transistor 112, a reset transistor 113, an amplification transistor 114, a selection transistor 115, and a floating diffusion FD node.

The floating diffusion FD node corresponds to an output node according to the present invention.

[Photoelectric Conversion Element 111]

The anode side of the photoelectric conversion element 111 is connected to the ground (GND), that is, grounded. The cathode side of the photoelectric conversion element 111 is connected to the source of the transfer transistor 112.

The photoelectric conversion element 111 performs photoelectric conversion of the incident light into charge (electrons) in accordance with the amount of the light to store the charge.

Each transistor is formed by an n-channel insulated-gate field-effect transistor, for example. Each transistor is connected as described below.

[Transfer Transistor 112]

The source of the transfer transistor 112 is connected to the cathode side of the photoelectric conversion element 111. The drain of the transfer transistor 112 is connected to the floating diffusion FD node. The gate of the transfer transistor 112 is connected to the transfer signal line LTRN(m).

The transfer transistor 112 transfers the charge stored in the photoelectric conversion element 111 to the floating diffusion FD node.

[Floating Diffusion Node FD]

The drain of the transfer transistor 112, the source of the reset transistor 113, and the gate of the amplification transistor 114 are commonly connected to the floating diffusion FD node.

[Reset Transistor 113]

The source of the reset transistor 113 is connected to the floating diffusion FD node. The drain of the reset transistor 113 is connected to a power source voltage VDD. The gate of the reset transistor 113 is connected to the reset signal line LRST(m).

The reset transistor 113 resets the electric potential of the floating diffusion FD node to the power source voltage VDD.

[Amplification Transistor 114]

The source of the amplification transistor 114 is connected to the drain of the selection transistor 115. The drain of the amplification transistor 114 is connected to the power source voltage VDD. The gate of the amplification transistor 114 is connected to the floating diffusion FD node.

The amplification transistor 114 amplifies the electric potential of the floating diffusion FD node.

Specifically, the amplification transistor 114 and the constant-current source circuit 14, which is connected to the vertical signal line LVSL(n), form a source follower circuit as shown in FIG. 2.

Consequently, an electric potential Vsl of the vertical signal line LVSL(n) and a potential Vfd of the floating diffusion FD node have the following relationship:

(Formula 1)

$$iv=(1/2)\cdot\beta\cdot(Vfd-Vth-Vsl)^2 \qquad (1)$$

In the formula (1), iv represents the value of a current i output from the constant-current source circuit 14, Vth represents the threshold of the amplification transistor 114, and β represents a predetermined constant.

According to the formula (1), the electric potential Vsl, the potential Vfd, and the threshold Vth have a linear relationship with a variation ratio of close to 1. Thus, the value (Vfd−Vth−Vsl) takes a constant value, and variations in the potential Vfd are reflected linearly in the electric potential Vsl.

[Selection Transistor 115]

The source of the selection transistor 115 is connected to the vertical signal line LVSL(n) at a node ND1. The drain of the selection transistor 115 is connected to the source of the amplification transistor 114. The gate of the selection transistor 115 is connected to the selection signal line LSEL(m).

The selection transistor 115 is turned on to output the analog signal voltage amplified by the amplification transistor 114 to the vertical signal line LVSL(n) when the charge of the pixel circuits 11 is read.

[Drive Method for Pixel Circuit 11]

A drive method for the pixel circuit 11 is now described. For simplicity of description, it is assumed that the analog signal read from the pixel circuits 11 to the vertical signal line LVSL(n) is directly input to the column processing circuit 17 with each connection switch of the switch section 15 kept on.

FIG. 3 is a timing chart showing an exemplary method for driving the pixel circuit according to the first embodiment of the present invention.

FIG. 3A represents the reset signal SRST. FIG. 3B represents the transfer signal STRN. FIG. 3C represents the selection signal SEL. FIG. 3D represents the analog signal voltage VSL.

At time t1, the row selection circuit 12 selects the address for the m-th row. The row drive circuit 13 receives a row selection signal from the row selection circuit 12 to start driving the pixel circuits 11 in the m-th row.

At this time, the row drive circuit 13 supplies a pulsed reset signal to the reset signal line LRST(m) as indicated by FIG. 3A. At the same time, the row drive circuit 13 supplies a pulsed transfer signal STRN to the transfer signal line LTRN (m) as indicated by FIG. 3B.

As a result, the transfer transistor 112 and the reset transistor 113 are turned on at the same time and are kept on for a period corresponding to the width of the pulse.

This causes the charge stored in the photoelectric conversion element 111 to be transferred to the floating diffusion FD node.

When the charge stored in the photoelectric conversion element 111 is discharged to the power source voltage VDD, the electric potential of the floating diffusion FD node is reset to the power source voltage VDD.

Such an action of resetting the electric potential of the floating diffusion FD node to the power source voltage VDD is referred to as "resetting" or "electronic shutter".

After the resetting, the photoelectric conversion element 111 receives the incident light to start storing the charge.

The row drive circuit 13 supplies the selection signal SEL at a high level to the selection signal line LSEL(m) during a period from time t2 to time t6, when the charge reading operation is finished, as indicated by FIG. 3C.

This causes the selection transistor 115 of the pixel circuit 11 to be kept on until the charge reading operation is finished for the pixel circuits 11 in the same row.

At time t2, the row drive circuit 13 supplies a pulsed reset signal SRST to the reset signal line LRST(m) as indicated by FIG. 3A.

This causes the electric potential of the floating diffusion FD node to be temporarily reset to the power source voltage VDD. Since the selection transistor 115 is on, the electric potential of the floating diffusion FD node is output to the vertical signal line LVSL(n) as the analog signal voltage VSL.

The analog signal VSL transmitted to the vertical signal line LVSL(n) at this time is a signal at a level established through the resetting, and is thus called "reset signal (first signal)".

As indicated by FIG. 3D, the level of the reset signal, that is, the analog signal VSL, increases sharply from time t2, and settles to a constant value at time t3.

At time t3, the first analog signal VSL, namely the reset signal, is read.

At this time, the column processing circuit 17 reads the analog signal VSL transmitted to the vertical signal line LVSL(n) to perform AD conversion of the analog signal voltage VSL.

The period in which the column processing circuit 17 performs AD conversion of the reset signal is hereinafter conveniently called "P phase".

At time t4, the row drive circuit 13 supplies a pulsed transfer signal STRN to the transfer signal line LTRN(m) as indicated by FIG. 3B.

During a period corresponding to the width of the pulse, the transfer transistor 112 is turned on while the reset transistor 113 is kept off.

This causes the charge stored in the photoelectric conversion element 111 to be transferred to the floating diffusion FD node. The electric potential of the floating diffusion FD node is amplified by the amplification transistor 114.

In the transfer signal STRN indicated by FIG. 3B, the period Δt from the falling edge of the pulse at time t1 to the falling edge of the pulse at time t4 is called "charge storage period", during which charge is stored in the photoelectric conversion element 111.

Since the amplification transistor 114 and the constant-current source circuit 14, which is connected to the vertical signal line LVSL(n), form a source follower circuit as shown in FIG. 2, a bias current flows between the constant-current source circuit 14 and the amplification transistor 114.

This causes the amplified electric potential of the floating diffusion FD node to be output to the vertical signal line LVSL(n) via the selection transistor 115 as the analog signal voltage VSL.

The analog signal VSL transmitted to the vertical signal line LVSL(n) at this time is a signal representing the charge stored in the photoelectric conversion element 111, and thus called "storage signal (second signal)".

As indicated by FIG. 3D, the level of the storage signal, that is, the analog signal VSL, decreases from time t4, and settles to a constant value at time t5.

At time t5, the second analog signal VSL, namely the storage signal, is read.

At this time, the column processing circuit 17 reads the analog signal VSL output from the pixel circuits 11 to the vertical signal line LVSL(n) to perform AD conversion of the analog signal voltage VSL.

The period in which the column processing circuit 17 performs AD conversion of the storage signal is hereinafter conveniently called "D phase".

The column processing circuit 17 digitizes the difference between the values of the first-read reset signal and the second-read storage signal.

The difference reflects the amount of charge stored in the floating diffusion FD node through photoelectric conversion performed by the photoelectric conversion element 111.

After that, the horizontal transfer circuit 19 selects column addresses sequentially to read the digital signals from the column processing circuit 17. The horizontal transfer circuit 19 then outputs the sequentially read digital signals to the output circuit 20.

The output circuit 20 amplifies the digital signals input from the horizontal transfer circuit 19 to output the digital signals as image data to an image processing apparatus outside the CMOS image sensor 1.

[Rolling Shutter]

FIG. 4 illustrates the concept of an exemplary rolling shutter according to the first embodiment of the present invention.

In FIG. 4, the horizontal axis represents time, and the vertical axis represents the selected row address.

Since the pixel circuits 11 discussed above are connected to the common reset signal line LRST(m), transfer signal line LTRN(m), and selection signal line LSEL(m) row by row, the resetting and the reading of the reset signal and the like are performed row by row.

For this purpose, the row selection circuit 12 selects the row addresses sequentially from the first row to the last row in order to read the analog signals (pixel signal) from all the pixel circuits 11 during one frame period.

Then, the row drive circuit 13 drives the pixel circuits 11 sequentially from the first row to the last row as indicated by the broken line A shown in FIG. 4 on the basis of the row selection signal from the row selection circuit 12 to reset the pixel circuits 11.

After that, the row drive circuit 13 drives the pixel circuits 11 sequentially from the first row to the last row as indicated by the solid line B shown in FIG. 4 to read the reset signals and the storage signals from the pixel circuits 11.

The resetting indicated by the broken line A and the reading of the reset signal and the storage signal indicated by the solid line B are executed in the same order for the pixel circuits 11 in each line so that the charge storage period Δt is equal for all the pixel circuits 11. Such a mechanism of the electronic shutter (resetting) is called "rolling shutter".

The charge storage period Δt shown in FIG. 4 is determined by adjusting the timing for resetting at time t1 and the timing for the transfer signal STRN to reach a high level at time t4 (see FIG. 3).

In the case of a movie, for example, the frequency of reading the reset signal and the storage signal is fixed at one frame period, and thus the exposure time may be adjusted freely by varying the timing for resetting. The exposure time is adjusted within the range of less than one frame period.

In the case where the charge storage period Δt is set to be short, the reading of the reset signal and the storage signal in the m1-th row (see the point α) and the resetting in the m2-th row (see the point β) may be performed generally at the same time at elapsed time t shown in FIG. 4.

In this case, the reading of the reset signal and the storage signal is executed in the m1-th row and the resetting is executed in the m2-th row immediately thereafter, for example, in a time sharing manner.

[Exemplary Configuration of Switch Section 15 and Holding Circuit Section 16]

The switch section 15 and the holding circuit section 16 are described with reference to FIG. 5.

Figure 5:
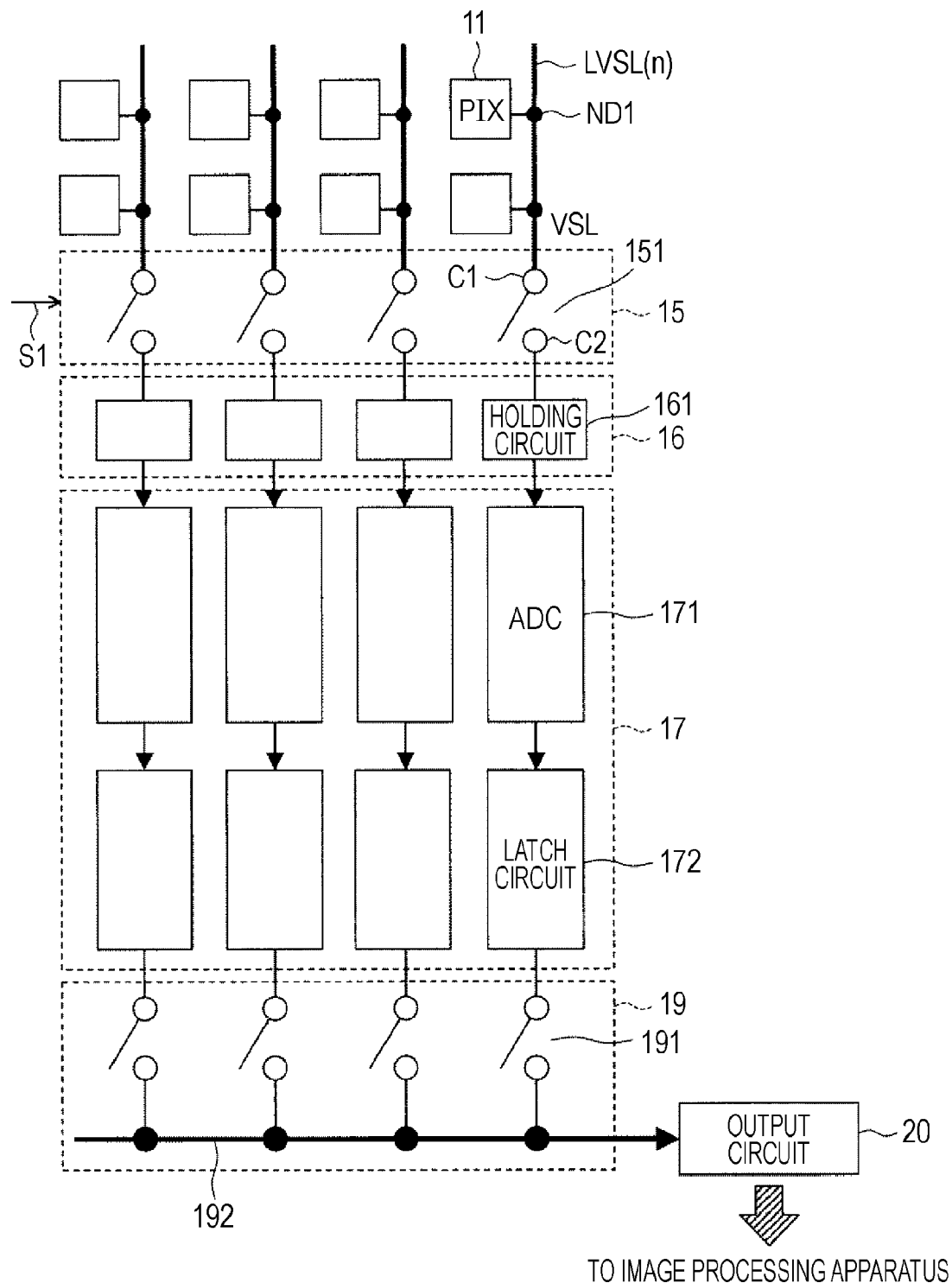
FIG. 5 is a block diagram showing an exemplary configuration of a switch section and a holding circuit section according to the first embodiment of the present invention.

FIG. 5 is a block diagram showing an exemplary configuration of a switch section and a holding circuit section according to the first embodiment of the present invention. FIG. 5 also shows an exemplary configuration of the column processing circuit 17 and the horizontal transfer circuit 19.

As shown in FIG. 5, the switch section 15 has a connection switch 151 for each column address. The holding circuit section 16 has a holding circuit 161 for each column address.

In FIG. 5, the connection switch 151 and the holding circuit 161 in the n-th column are described.

[Connection Switch 151]

A connection terminal C1 of the connection switch 151 is connected to the vertical signal line LVSL(n). A connection terminal C2 of the connection switch 151 is connected to the input terminal of the holding circuit 161.

The connection switch 151 closes or opens the connection between the vertical signal line LVSL(n) and the holding circuit 161 on the basis of the selection signal S1 input from the control section 18.

Specifically, the connection switch 151 is turned from off to on when an ADC 171 to be discussed later reads the reset signal, and is turned from on to off after the holding circuit 161 holds the voltage of the reset signal. The connection switch 151 also operates in the same way when the ADC 171 reads the storage signal.

[Holding Circuit 161]

The input terminal of the holding circuit 161 is connected to the connection terminal C2 of the connection switch 151. The output terminal of the holding circuit 161 is connected to a first input terminal of a comparator 1711 of the ADC 171 (see FIG. 9).

When the connection switch 151 is turned on, the analog signal voltage VSL transmitted to the vertical signal line LVSL(n) is input to the input terminal of the holding circuit 161.

The holding circuit 161 holds the analog signal voltage VSL, and outputs the analog signal voltage VSL being held to the ADC 171.

The period for which the holding circuit 161 holds the analog signal voltage VSL is referred to as "holding period".

Once the analog signal voltage VSL is held, the holding circuit 161 is allowed to output the analog signal voltage VSL being held to the ADC 171 even if the connection switch 151 is turned from on to off.

[Exemplary Configuration of Column Processing Circuit 17]

The column processing circuit 17 is described below with reference to FIG. 5.

As shown in FIG. 5, the column processing circuit 17 includes an ADC (Analog Digital Converter) 171 and a latch circuit 172 for each column address.

In FIG. 5, the ADC 171 and the latch circuit 172 in the n-th column are described.

Each constituent element of the column processing circuit 17 is connected as described below.

The input side of the ADC 171 is connected to the output terminal of the holding circuit 161. The output side of the ADC 171 is connected to the input terminal of the latch circuit 172.

The input terminal of the latch circuit 172 is connected to the output side of the ADC 171. The output terminal of the latch circuit 172 is connected to a transfer bus 192 via a transfer switch 191.

The horizontal transfer circuit 19 has n transfer switches 191 (one transfer switch 191 for each column address) and a transfer bus 192.

Each transfer switch 191 is connected between the output terminal of the latch circuit 172 and the transfer bus 192.

The transfer bus 192 includes signal lines the number of which is the same as the number of bits. One end of each of the signal lines is commonly connected to the output circuit 20.

[ADC 171]

The ADC 17 reads the analog signal VSL from the pixel circuits 11 in the selected column twice during one pixel period to perform AD conversion.

Specifically, the ADC 171 converts the analog signal VSL as the reset signal into a digital signal in the P phase.

The ADC 171 converts the analog signal VSL as the storage signal into a digital signal in the D phase.

The digital signals contain noise such as a reset component and an offset component, and thus are not identical to signals obtained by AD conversion of genuine pixel signals acquired by the pixel circuits 11.

Accordingly, the ADC 171 outputs a digital value (count value) obtained as the difference between the reset signal obtained through the AD conversion in the P phase and the storage signal obtained through the AD conversion in the D phase to the latch circuit 172 as the genuine digital value.

[Latch Circuit 172]

The latch circuit 172 latches (stores) the digital value input from the ADC 171 while the horizontal transfer circuit 19 keeps off the transfer switch 191.

[Horizontal Transfer Circuit 19]

The horizontal transfer circuit 19 selects a column address. In order to read the digital values from the latch circuits 172, the horizontal transfer circuit 19 turns from off to on the transfer switch 191 for each column sequentially from the first column to the last column, for example, to read the digital value from the latch circuit 172 for each column.

When the transfer switch 191 in the n-th column is turned from off to on, the digital value read from the latch circuit 172 is transferred to the output circuit 20 via the transfer bus 192.

[Details of Holding Circuit 161]

The holding circuit 161 is described in detail with reference to FIGS. 6 and 7.

Figure 6:
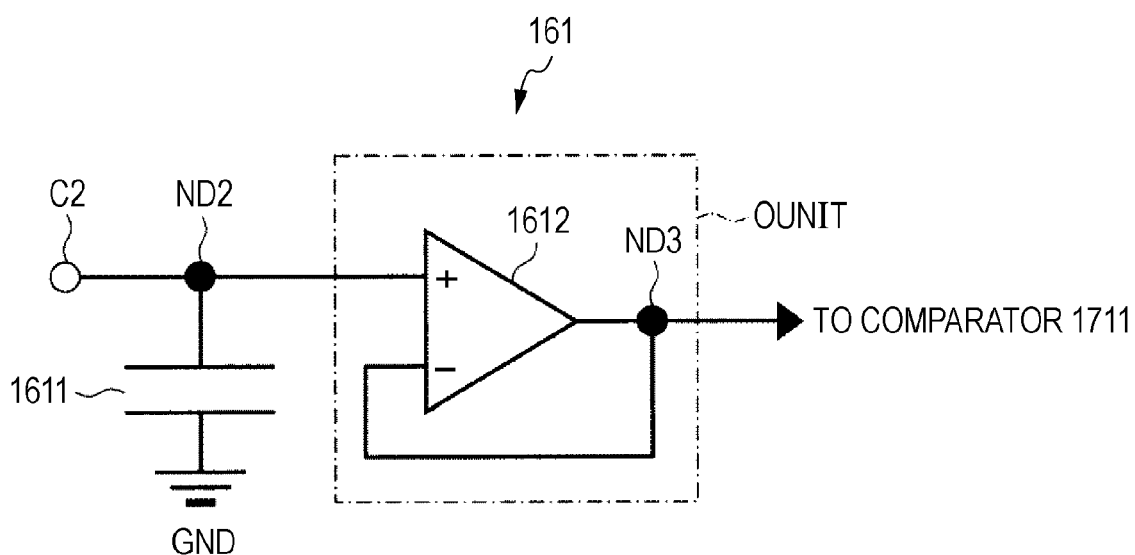
FIG. 6 is an equivalent circuit diagram showing an exemplary configuration of a holding circuit according to the first embodiment of the present invention.

FIG. 6 is an equivalent circuit diagram showing an exemplary configuration of a holding circuit according to the first embodiment of the present invention.

Figure 7:
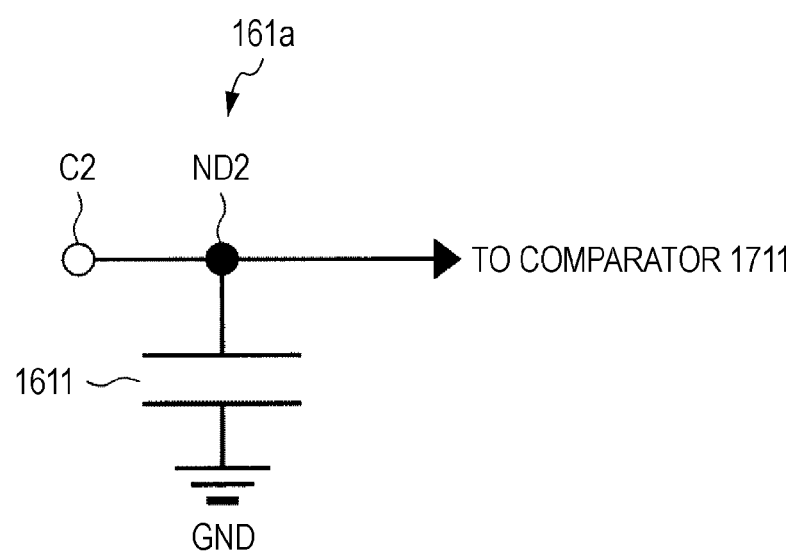
FIG. 7 is an equivalent circuit diagram showing an exemplary basic configuration of the holding circuit according to the first embodiment of the present invention.

FIG. 7 is an equivalent circuit diagram showing an exemplary basic configuration of the holding circuit according to the first embodiment of the present invention.

As shown in FIG. 6, the holding circuit 161 includes a capacitor 1611 and an output section OUNIT.

The output section OUNIT includes an OP amplifier (operational amplifier) 1612 to form a voltage follower circuit.

A first electrode of the capacitor 1611 is connected to the ground (GND), that is, grounded. A second electrode of the capacitor 1611 is connected to a node ND2.

A non-inverting input terminal (+) of the OP amplifier 1612 is connected to the node ND2. An inverting input terminal (−) and an output terminal of the OP amplifier 1612 are commonly connected to a node ND3 so that an output of the OP amplifier 1612 is returned to the inverting input terminal as negative feedback.

The node ND2 is connected to the connection terminal C2 of the connection switch 151.

Figure 9:
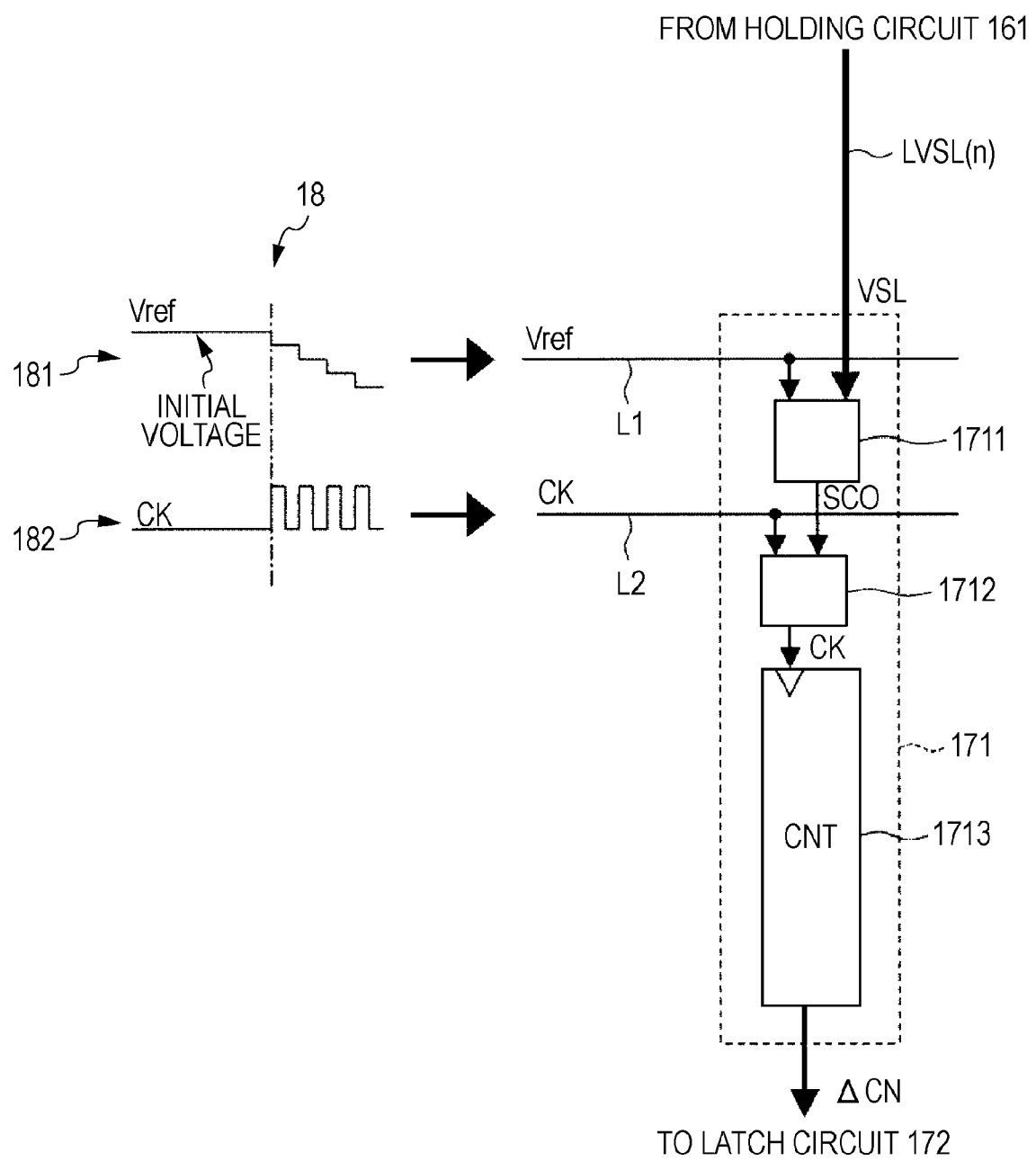
FIG. 9 is a schematic block diagram showing an exemplary configuration of an ADC according to the first embodiment of the present invention.

The node ND3 is connected to the first input terminal of the comparator 1711 of the column processing circuit 17 (see FIG. 9).

The holding circuit 161 configured as shown in FIG. 6 operates as follows.

When the connection switch 151 is turned from off to on, the analog signal voltage VSL is supplied from the pixel circuit 11 in the selected row to the node ND2 via the vertical signal line LVSL(n).

The capacitor 1611 charges (stores) the analog signal voltage VSL until a holding voltage reaches the analog signal voltage VSL.

The holding voltage refers to the voltage between the first electrode and the second electrode of the capacitor 1611. The period until the holding voltage reaches the analog signal voltage VSL is referred to as "charging period".

The capacitor 1611 has been discharged when the charging starts.

When the electric potential of the node ND2 is input to the non-inverting input terminal of the OP amplifier 1612, the output of the OP amplifier 1612 is returned to the inverting input terminal as negative feedback, causing the OP amplifier 1612 to output the electric potential of the node ND2 from the node ND3.

When the capacitor 1611 is completely charged, the connection switch 151 is turned from on to off.

At this time, the capacitor 161 is holding the analog signal voltage VSL, and thus the OP amplifier 1612 outputs the electric potential of the node ND2, that is, the analog signal voltage VSL, to the node ND3. The analog signal voltage VSL is held until the capacitor 1611 starts being discharged.

The holding circuit 161 may be capable of just holding the analog signal voltage VSL as discussed above. Therefore, a holding circuit 161a which includes only the capacitor 1611 as shown in FIG. 7 may be used.

Because the holding circuit 161a shown in FIG. 7 is provided with no output section OUNIT, however, the holding voltage of the capacitor 1611 is output directly, and not with a low impedance, to the comparator 1711.

Therefore, the analog signal voltage VSL is easily influenced by inversion noise due to an inverted output of the comparator 1711 when the analog signal voltage VSL undergoes AD conversion performed by the ADC 171 in the following stage. In order to prevent the influence of the inversion noise, it is necessary to increase the capacitance of the capacitor 1611.

If the capacitance of the capacitor 1611 is increased, the time taken to charge the analog signal voltage VSL increases, which hinders increasing the speed of reading the reset signal or the storage signal.

It is thus desirable that the holding circuit 161 should be provided with the output section OUNIT which enables output with a low impedance as shown in FIG. 6.

Since the holding circuit 161 is capable of output with a low impedance, a fixed gain may be applied to the output.

[Modification of Holding Circuit 161]

Figure 8:
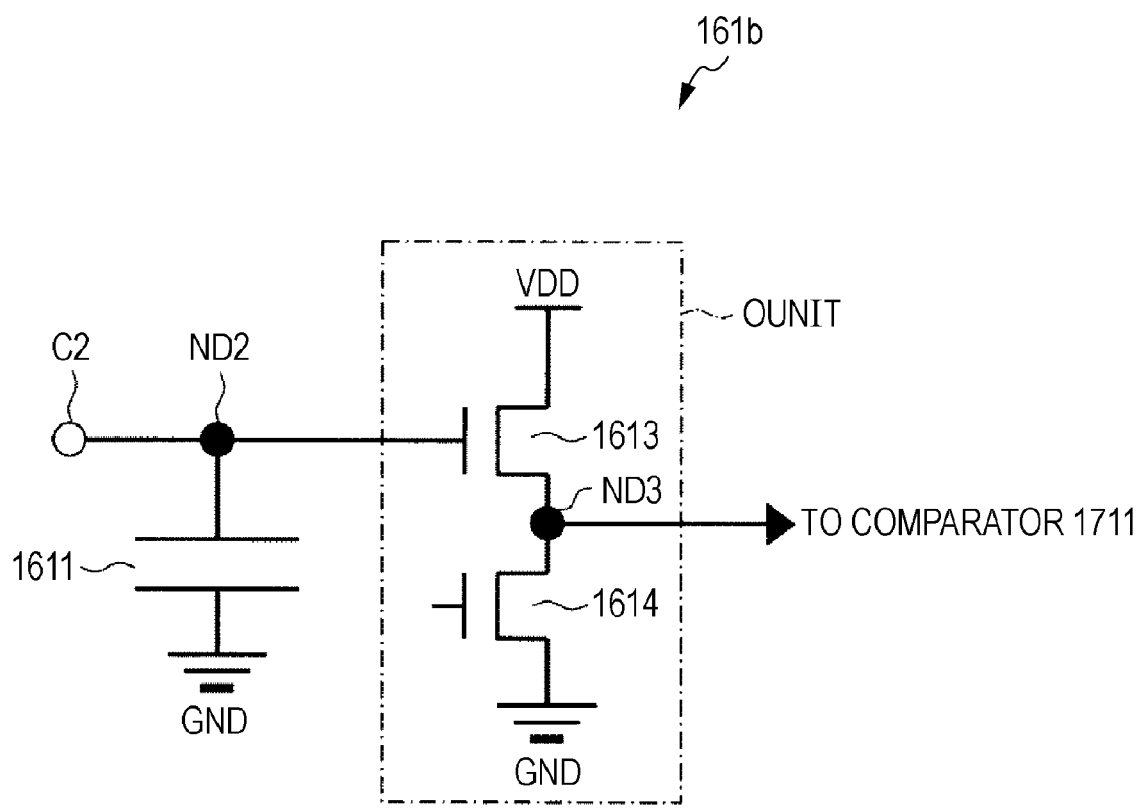
FIG. 8 is an equivalent circuit diagram showing a modification of the holding circuit according to the first embodiment of the present invention.

The holding circuit 161 may be configured as shown in FIG. 8.

FIG. 8 is an equivalent circuit diagram showing a modification of the holding circuit according to the first embodiment of the present invention.

As shown in FIG. 8, the output section OUNIT of a holding circuit 161b includes a transistor 1613 and a transistor 1614 to form a source follower circuit.

Each of the transistors 1613 and 1614 is formed by an n-channel insulated-gate field-effect transistor, for example.

The drain of the transistor 1613 is connected to the power source voltage VDD. The gate of the transistor 1613 is connected to the node ND2.

The source of the transistor 1613 and the drain of the transistor 1614 are commonly connected to the node ND3.

The source of the transistor 1614 is grounded. To the gate of the transistor 1614, a predetermined voltage at which the transistor 1614 operates as a power source is applied, for example.

Since the output section OUNIT is a source follower circuit, the electric potential of the node ND2 is linearly reflected in the electric potential of the node ND3, and is output at a low impedance.

The holding circuit 161b shown in FIG. 8 may be used in place of the holding circuit 161 to achieve the same result as with the holding circuit 161 discussed above.

[Exemplary Configuration of ADC 171]

An exemplary configuration of the ADC 171 shown in FIG. 5 is described in detail.

FIG. 9 is a schematic block diagram showing an exemplary configuration of an ADC according to the first embodiment of the present invention.

In FIG. 9, the ADC 171 in the n-th row is shown. As shown in FIG. 9, the ADC 171 includes a comparator 1711, a gate circuit 1712, and a counter (CNT) 1713. The comparator 1711 corresponds to a comparison section according to the present invention.

Each constituent element of the ADC 171 is connected as described below.

A first input terminal of the comparator 1711 is connected to the output terminal of the holding circuit 161 (node ND3). A second input terminal of the comparator 1711 is connected to a first signal line L1. The output terminal of the comparator 1711 is connected to a first input terminal of the gate circuit 1712.

The first input terminal of the gate circuit 1712 is connected to the output terminal of the comparator 1711. A second input terminal of the gate circuit 1712 is connected to a second signal line L2. The output terminal of the gate circuit 1712 is connected to the input terminal of the counter 1713.

The input terminal of the counter 1713 is connected to the output terminal of the gate circuit 1712. The output terminal of the counter 1713 is connected to the latch circuit 172 (see FIG. 5).

One end of the first signal line L1 is connected to the reference voltage generation section 181 of the control section 18.

One end of the second signal line L2 is connected to the clock generation section 182 of the control section 18.

[Comparator 1711]

The analog signal voltage VSL held by the holding circuit 161 is input to the first input terminal of the comparator 1711. A reference voltage Vref is input to the second input terminal of the comparator 1711 from the control section 18 via the first signal line L1.

As shown in FIG. 9, the reference voltage Vref is a signal voltage in a RAMP waveform which decreases in constant steps from an initial voltage in sync with a clock signal CK generated by the control section 18. The initial voltage is a black electric potential (black reference), for example.

When the analog signal voltage VSL and the reference voltage Vref are input to the comparator 1711, the comparator 1711 starts a comparison as to which of the analog signal voltage VSL and the reference voltage Vref is higher. When the reference voltage Vref becomes lower than the analog signal voltage VSL, the output of the comparator 1711 is inverted.

For example, if the reference voltage Vref is higher than the analog signal voltage VSL (Vref>VSL), the comparator 1711 outputs the output signal SCO at a high level to the first input terminal of the gate circuit 1712.

If the reference voltage Vref is lower than the analog signal voltage VSL (Vref<VSL), in contrast, the comparator 1711 outputs the output signal SCO at a low level to the first input terminal of the gate circuit 1712 as an inverted output.

[Gate Circuit 1712]

The output signal SCO is input to the first input terminal of the gate circuit 1712 from the comparator 1711. The clock signal CK is input to the second input terminal of the gate circuit 1712 from the control section 18 via the second signal line L2.

The gate circuit 1712 outputs the clock signal CK to the input terminal of the counter 1713 during a period since the comparator 1711 starts the comparison between the voltages until the output of the comparator 1711 is inverted. When the output of the comparator 1711 is inverted, the gate circuit 1712 causes the counter 1713 to stop its counting operation.

For example, when the output signal SCO is at a high level, the gate circuit 1712 outputs the clock signal CK to the counter 1713.

When the output signal SCO is inverted from a high level to a low level, the gate circuit 1712 stops outputting the clock signal CK to the counter 1713.

[Counter 1713]

The clock signal CK is input to the input terminal of the counter 1713 from the gate circuit 1712 during a period since the comparator 1711 starts the comparison between the voltages until the output of the comparator 1711 is inverted.

The counter 1713 starts counting the clock signal CK when input of the clock signal CK starts, and stops counting the clock signal CK when the input of the clock signal CK stops.

Specifically, the counter 1713 counts down the clock signal CK in the P phase. In the D phase, the counter 1713 counts up the clock signal CK from a count value at which the counting down in the P phase is terminated.

A count value in the P phase is represented as a count value CNP (first count value). A count value in the D phase is represented as a count value CND (second count value).

The count value CNP in the P phase is a count value for the reset signal. The count value in the D phase is a count value for the storage signal.

Thus, a count value ΔCN based on the genuine pixel signal is obtainable by calculating the difference ΔCN between the count value CND in the D phase and the count value CNP in the P phase (ΔCN=CND−CNP).

Alternatively, the counter 1713 may be configured to operate as follows.

For example, the counter 1713 may count up the clock signal CK in the P phase. Then, the counter 1713 may invert the sign of the count value CNP after the termination of the counting up in the P phase to start counting up from the count value CNP with the inverted sign.

Also in this case, the genuine count value ΔCN is obtainable by calculating the difference ΔCN between the count value CND in the D phase and the count value CNP in the P phase (ΔCN=CND−CNP).

After the termination of the counting in the D phase, the counter 1713 calculates the genuine count value ΔCN discussed above to output the count value ΔCN to the latch circuit 172 (see FIG. 5).

[Exemplary Operation of CMOS Image Sensor]

An exemplary operation of a CMOS image sensor is described with reference to FIG. 10.

Figure 10:
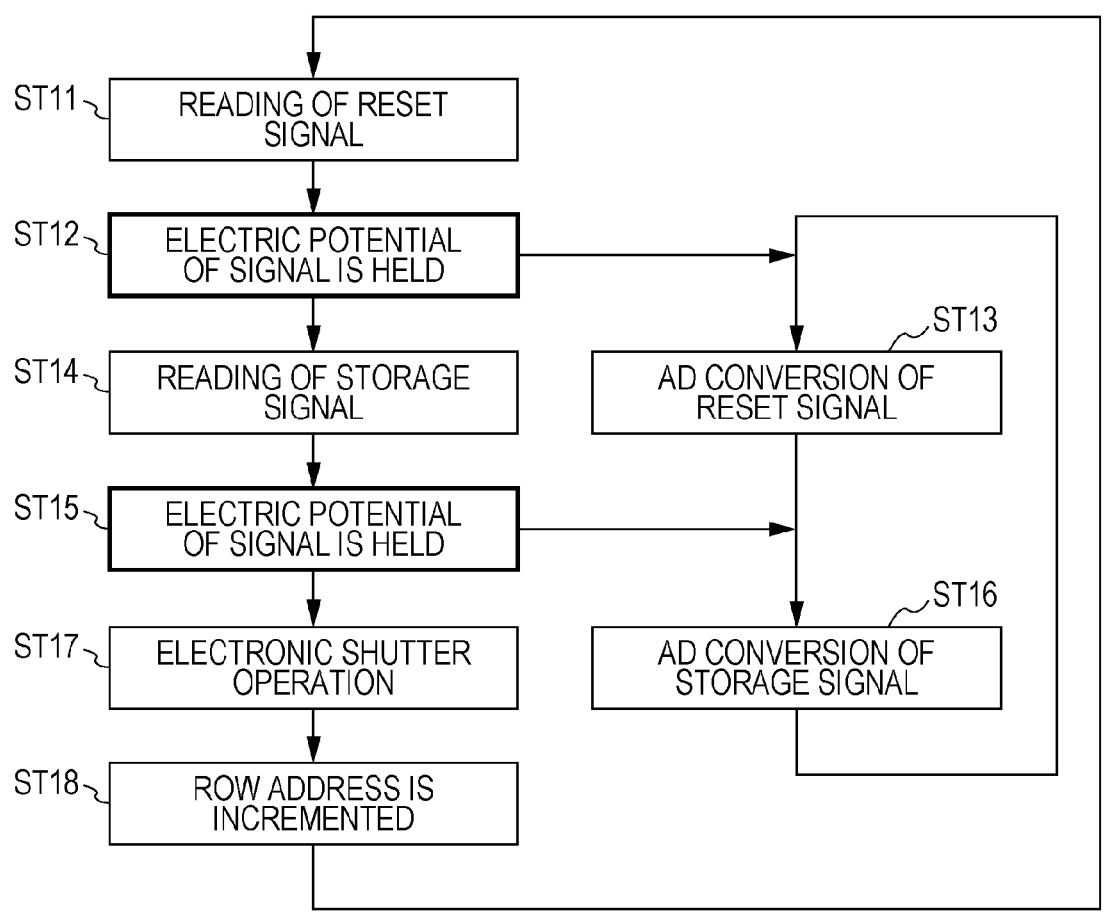
FIG. 10 is a flowchart showing exemplary operation of the CMOS image sensor according to the first embodiment of the present invention.

FIG. 10 is a flowchart showing an exemplary operation of the CMOS image sensor according to the first embodiment of the present invention.

[Step ST11: Reading Reset Signal]

It is assumed that the pixel circuits 11 in the m-th row are to be driven. The row selection circuit 12 selects the row address for the m-th row, and the row drive circuit 13 drives the pixel circuits 11 in the m-th row.

As shown in FIG. 3, each ADC 171 of the column processing circuit 17 reads the reset signal from the pixel circuit 11 in the m-th row at time t3 (P phase).

At this moment, each connection switch 151 of the switch section 15 has been kept off so that the holding circuit 161 and the vertical signal line LVSL(n) are disconnected from each other.

Thus, although the pixel circuit 11 in the m-th row has output the analog signal VSL as the reset signal to the vertical signal lines LVSL(n), the analog signal VSL has not been input to the holding circuits 161 yet.

[Step ST12: Holding Signal Electric Potential]

The control section 18 outputs the control signal S1 to the switch section 15 to turn from off to on each connection switch 151.

This causes the vertical signal line LVSL(n) and the holding circuit 161 to be connected to each other, which causes the analog signal voltage VSL as the reset signal to be input to the holding circuit 161. The holding circuit 161 then starts holding the analog signal voltage VSL.

When the holding voltage of the capacitor 1611 reaches the analog signal voltage VSL to complete charging, the control section 18 outputs the control signal S1 to the switch section 15 to turn from on to off each connection switch 151. This causes the vertical signal line LVSL(n) and the holding circuit 161 to be disconnected from each other.

[Step ST13: AD Conversion of Reset Signal]

When the analog signal voltage (reset signal voltage) VSL and the reference voltage Vref are input to the comparator 1711, the comparator 1711 starts a comparison (first comparison) as to which of the analog signal voltage VSL and the reference voltage Vref is higher.

If the reference voltage Vref is higher than the analog signal voltage VSL (Vref>VSL), the comparator 1711 outputs the output signal SCO at a high level to the first input terminal of the gate circuit 1712.

If the reference voltage Vref is lower than the analog signal voltage VSL (Vref<VSL), meanwhile, the comparator 1711 outputs the output signal SCO at a low level to the first input terminal of the gate circuit 1712 as an inverted output.

After that, the gate circuit 1712 outputs the clock signal CK to the input terminal of the counter 1713 during a period since the comparator 1711 starts the comparison between the voltages until the output of the comparator 1711 is inverted.

The counter 1713 then counts down the clock signal CK during a period since the comparator 1711 starts the comparison between the voltages until the output of the comparator 1711 is inverted.

[Step ST14: Reading Storage Signal]

As shown in FIG. 3, each ADC 171 of the column processing circuit 17 reads the storage signal from the pixel circuit 11 in the m-th row at time t5 (D phase).

At this moment, each connection switch 151 of the switch section 15 has been kept off so that the holding circuit 161 and the vertical signal line LVSL(n) are disconnected from each other.

Thus, although the pixel circuit 11 in the m-th row has output the analog signal VSL as the storage signal to the vertical signal lines LVSL(n), the analog signal VSL has not been input to the holding circuit 161 yet.

[Step ST15: Holding Signal Electric Potential]

As in the process of step ST12, the control section 18 outputs the control signal S1 to the switch section 15 to turn from off to on each connection switch 151.

This causes the vertical signal line LVSL(n) and the holding circuit 161 to be connected to each other, which causes the analog signal voltage VSL as the storage signal to be input to the holding circuit 161. The holding circuit 161 then starts holding the analog signal voltage VSL.

When the holding voltage of the capacitor 1611 reaches the analog signal voltage VSL to complete charging, the control section 18 outputs the control signal S1 to the switch section 15 to turn from on to off each connection switch 151. This causes the vertical signal line LVSL(n) and the holding circuit 161 to be disconnected from each other.

[Step ST16: AD Conversion of Storage Signal]

When the analog signal voltage (storage signal voltage) VSL and the reference voltage Vref are input to the comparator 1711, the comparator 1711 starts a comparison (second comparison) as to which of the analog signal voltage VSL and the reference voltage Vref is higher.

If the reference voltage Vref is higher than the analog signal voltage VSL, the comparator 1711 outputs the output signal SCO at a high level to the first input terminal of the gate circuit 1712.

If the reference voltage Vref is lower than the analog signal voltage VSL, meanwhile, the comparator 1711 outputs the output signal SCO at a low level to the first input terminal of the gate circuit 1712 as an inverted output.

After that, the gate circuit 1712 outputs the clock signal CK to the input terminal of the counter 1713 during a period since the comparator 1711 starts the comparison between the voltages until the output of the comparator 1711 is inverted.

The counter 1713 then counts up the clock signal CK from a count value at which the counting down in the P phase is terminated. After the termination of the counting in the D phase, the counter 1713 calculates the genuine count value ΔCN discussed above to output the count value ΔCN to the latch circuit 172.

This causes the latch circuit 172 in each column to latch the count value ΔCN input from the counter 1713 until the horizontal transfer circuit 19 turns on the transfer switch 191.

[Step ST17: Electronic Shutter Operation]

As described in the [Rolling Shutter], in the case where it is necessary to reset the pixel circuit 11 in another row at constant address intervals in a time sharing manner, the resetting (electronic shutter) operation is executed on the pixel circuit 11 in the m-th row or another row.

Thus, in the case where resetting is not executed in a time sharing manner, the process in step ST17 is omitted, and the process in step ST15 is directly followed by the process in step ST18.

[Step ST18: Incrementing Row Address]

The horizontal transfer circuit 19 turns on the transfer switch 191 in each column sequentially from the first column to the last column to read the count value ΔCN from the latch circuit 172 in each column.

When the transfer switch 191 in the n-th column is turned on, the count value ΔCN read from the latch circuit 172 is transferred to the output circuit 20 via the transfer bus 192.

The row selection circuit 12 may select the row address for the (m+1)-th row to increment the row address so that the row drive circuit 13 drives the pixel circuits 11 in the (m+1)-th row.

Alternatively, the row address may be decremented so that the row drive circuit 13 drives the pixel circuits 11 in the (m−1)-th row.

After that, the column processing circuit 17 performs the process in step ST11 on the pixel circuits 11 in the (m+1)-th row.

[Parallel Operation of CMOS Image Sensor 1]

Operations such as reading of analog signals from the pixel section 10, AD conversion performed by the column processing circuit 17, and external output of digital signals may be performed in parallel appropriately. Exemplary parallel operation is described with reference to FIG. 11.

Figure 11:
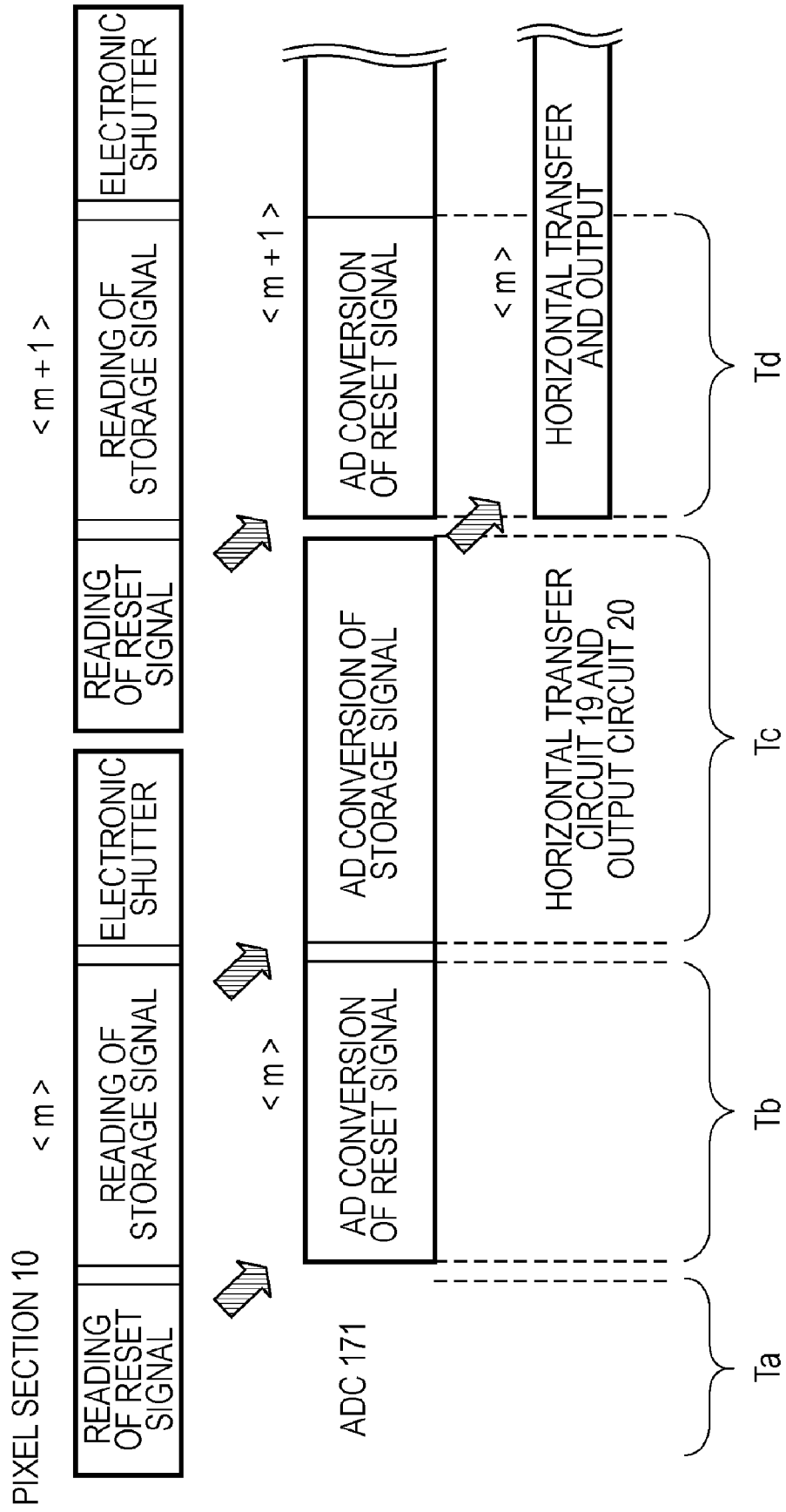
FIG. 11 is a sequence diagram showing exemplary parallel operation of the CMOS image sensor according to the first embodiment of the present invention.

FIG. 11 is a sequence diagram showing exemplary parallel operation of the CMOS image sensor according to the first embodiment of the present invention.

In FIG. 11, parallel operation on the pixel circuits 11 in the m-th row and the (m+1)-th row is illustrated.

[Period Ta]

As shown in FIG. 11, in a period Ta, reading of the reset signal for the pixel circuit 11 in the m-th row (see step ST11) is performed.

[Period Tb]

In a period Tb, reading of the storage signal (see step ST14) and AD conversion of the reset signal (see step ST13) for the pixel circuit 11 in the m-th row are performed in parallel.

[Period Tc]

In a period Tc, electronic shutter operation (see step ST17) and AD conversion of the storage signal (see step ST16) for the pixel circuit 11 in the m-th row are performed in parallel.

In addition, reading of the reset signal (see step ST11) and AD conversion of the storage signal (see step ST16) for the pixel circuit 11 in the (m+1)-th row are also performed in parallel.

[Period Td]

In a period Td, reading of the storage signal (step ST14) and AD conversion of the reset signal (step ST13) for the pixel circuit 11 in the (m+1)-th row are performed in parallel.

In addition, a digital signal obtained through the AD conversion of the storage signal performed on the pixel circuit 11 in the m-th row in the period Tc is transferred to the output circuit 20 via the horizontal transfer circuit 19.

According to the first embodiment described above, AD conversion of the reset signal and reading of the storage signal are performed in parallel with the holding circuit 161 holding the reset signal.

In addition, AD conversion of the storage signal and electronic shutter operation are performed in parallel with the holding circuit 161 holding the storage signal.

Further, AD conversion of the storage signal and reading of the reset signal for the pixel circuit 11 in the next row are performed in parallel.

Consequently, it is possible to quickly perform AD conversion of analog signals while securing a sufficient temporal margin for reading analog signals from the pixel section. As a result, it is possible to achieve a higher pixel resolution and a higher frame rate.

<2. Second Embodiment>

In a second embodiment, a CMOS image sensor that is provided with neither the switch section 15 nor the holding circuit section 16 shown in FIG. 1 is described and compared with the CMOS image sensor according to the first embodiment.

[Exemplary Configuration of CMOS Image Sensor 1a]

The CMOS image sensor mentioned above is described with reference to FIG. 12.

Figure 12:
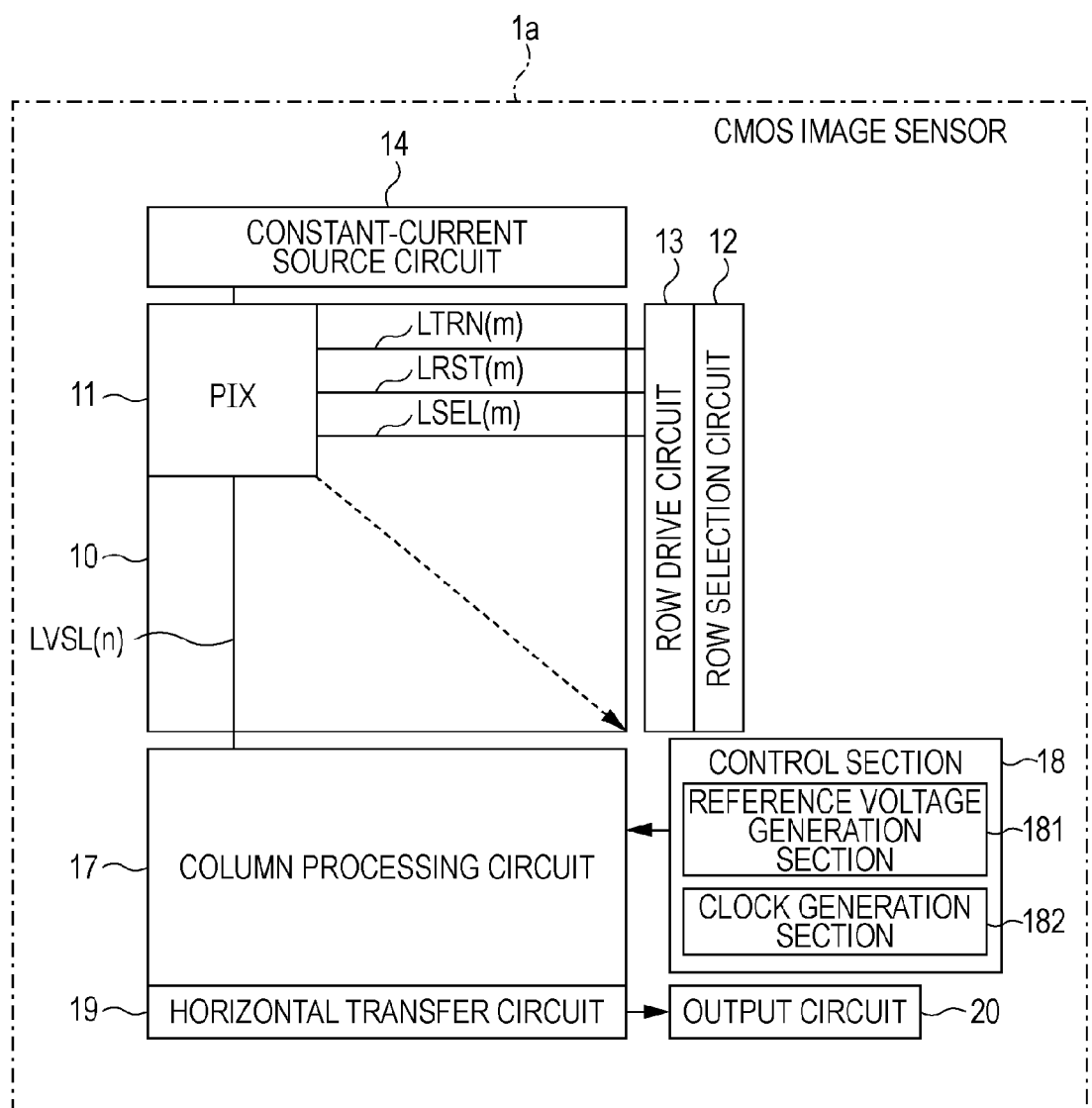
FIG. 12 is a schematic block diagram showing an exemplary configuration of a CMOS image sensor according to a second embodiment of the present invention.

FIG. 12 is a schematic block diagram showing an exemplary configuration of a CMOS image sensor according to a second embodiment of the present invention.

Figure 13:
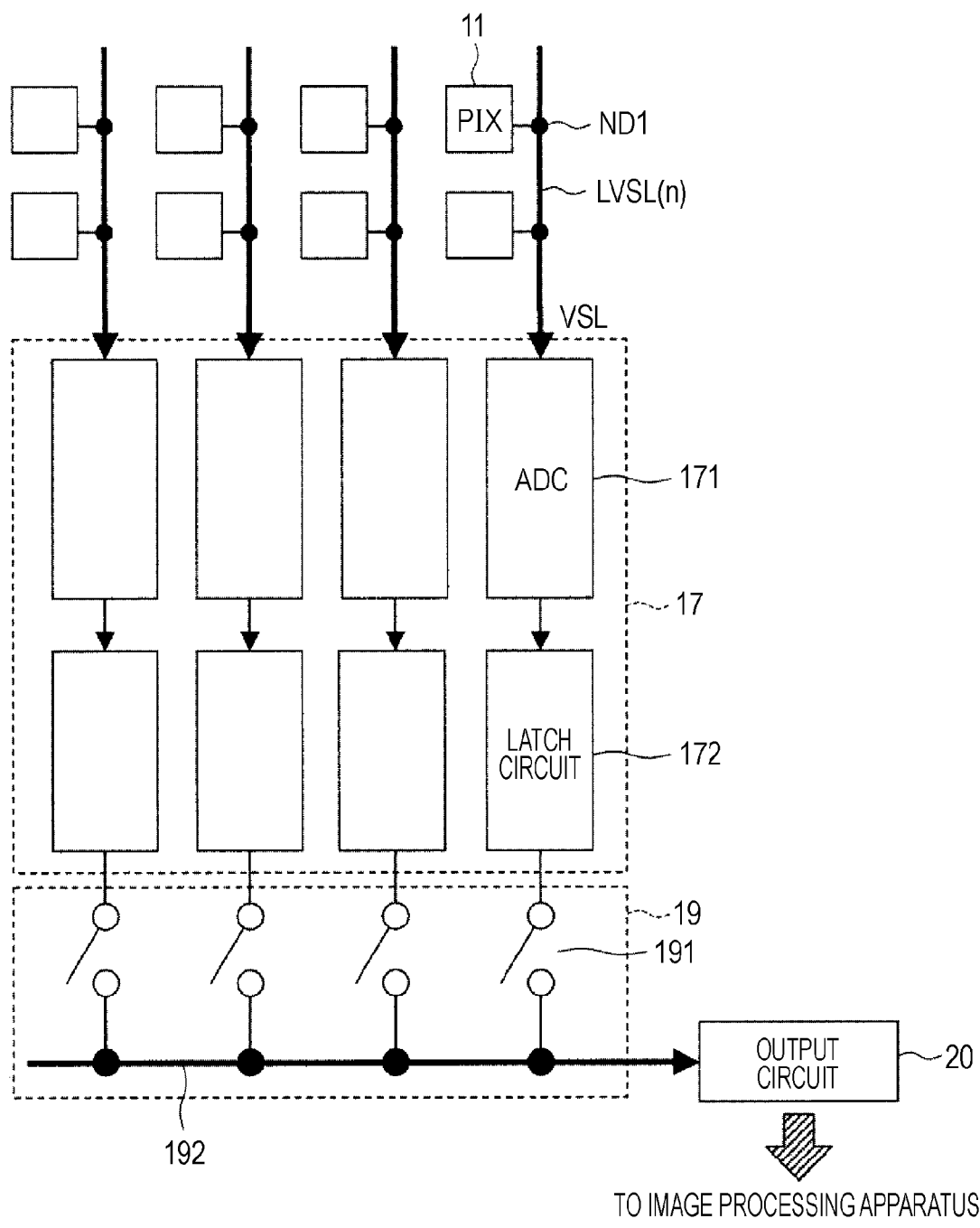
FIG. 13 is a schematic block diagram showing an exemplary configuration around a column processing circuit according to the second embodiment of the present invention.

FIG. 13 is a schematic block diagram showing an exemplary configuration around a column processing circuit according to the second embodiment of the present invention.

As shown in FIG. 12, a CMOS image sensor 1a includes a pixel section 10, a pixel circuit (PIX) 11, a row selection circuit 12, a row drive circuit 13, a constant-current source circuit 14, a column processing circuit 17, a control section 18, a horizontal transfer circuit 19, and an output circuit 20.

As described above, the CMOS image sensor 1a is provided with neither the switch section 15 nor the holding circuit section 16 shown in FIG. 1. Thus, as shown in FIG. 13, the analog signal voltage VSL transmitted from the pixel circuit 11 to the vertical signal line LVSL(n) is directly input to the ADC 171 of the column processing circuit 17.

[Exemplary Operation of CMOS Image Sensor 1a]

Exemplary operation of the CMOS image sensor 1a shown in FIG. 12 is described with reference to FIG. 14.

Figure 14:
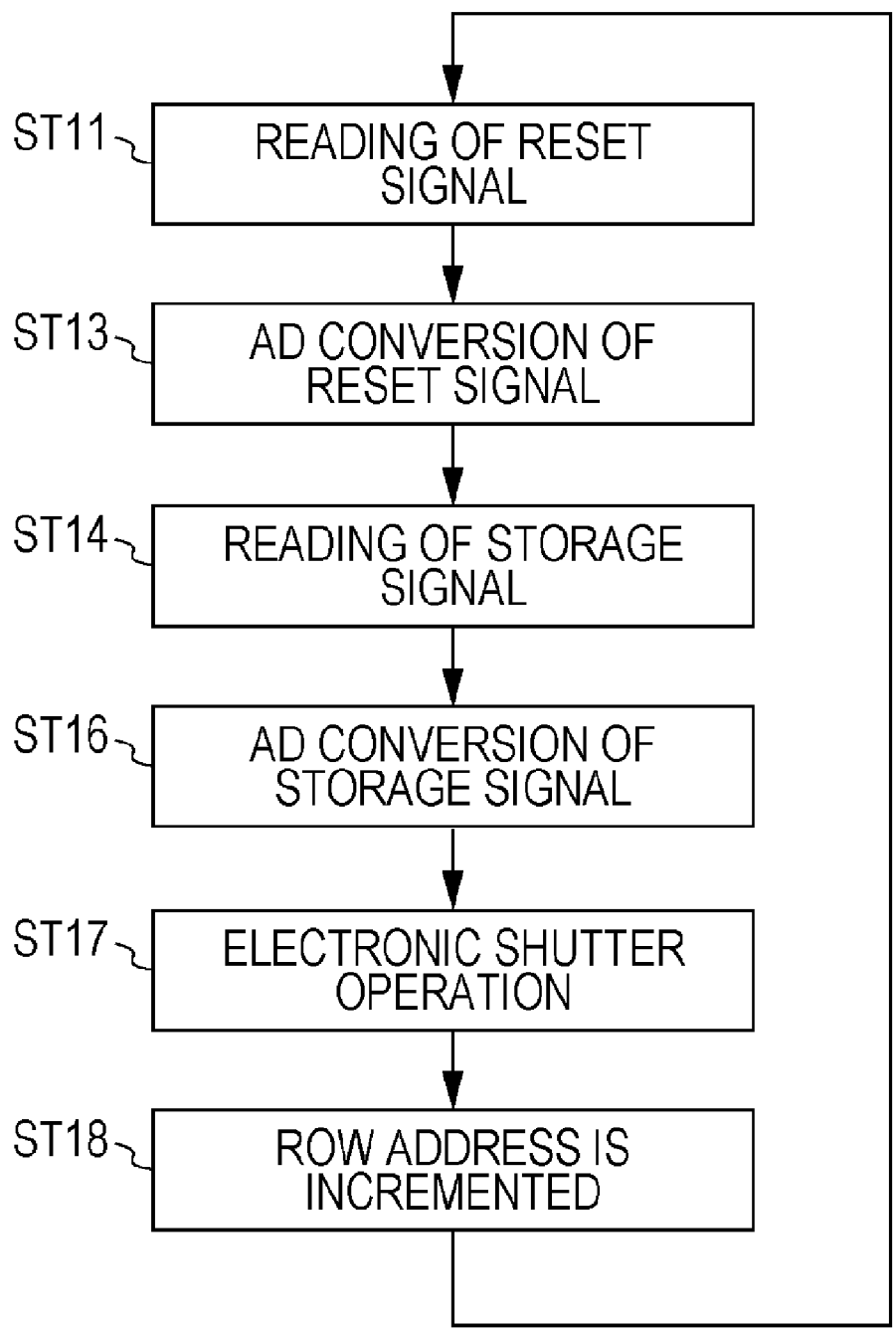
FIG. 14 is a flowchart showing exemplary operation of the CMOS image sensor according to the second embodiment of the present invention.

FIG. 14 is a flowchart showing exemplary operation of the CMOS image sensor according to the second embodiment of the present invention.

Since neither the switch section 15 nor the holding circuit section 16 is provided in the second embodiment, the reset signal transmitted from the pixel circuit 11 to the vertical signal line LVSL(n) is directly input to the ADC 171 of the column processing circuit 17.

Thus, as shown in FIG. 14, the electric potential of the signal is not held (steps ST12 and ST15), and reading of the reset signal (step ST11) is directly followed by AD conversion of the reset signal (step ST13). The storage signal is also processed in the same manner.

If the resolution of an image is increased from 10 bits to 12 bits, for example, the number of steps of the reference voltage Vref shown in FIG. 9 becomes one-fourth, and the number of counts on the counter 1713 taken for AD conversion becomes four times.

Even if the frequency of the clock signal CK shown in FIG. 9 is increased to increase the rate of AD conversion performed by the ADC 171, there is a limit to the degree to which the time taken to read analog signals is shortened. In order for the ADC 171 to quickly start AD conversion, it is necessary to immediately settle the analog signal voltage VSL transmitted to the vertical signal line LVSL(n). In practice, however, settling takes a time in the order of microseconds because of signal delay etc.

With the CMOS image sensor 1a according to the second embodiment, the holding circuit section 16 does not hold the electric potential of the signals, and thus the time taken for reading of analog signals which includes settling is added to the time for other processes including AD conversion.

With the CMOS image sensor 1 according to the first embodiment, in contrast, operations such as reading of analog signals, AD conversion performed by the column processing circuit 17, and external output of digital signals may be performed in parallel by virtue of holding the electric potential of the signals.

This advantageously allows the CMOS image sensor 1 according to the first embodiment to quickly perform AD conversion of analog signals while securing a sufficient temporal margin for reading analog signals.

It is thus desirable to provide the switch section 15 and the holding circuit section 16 in order to perform the various operations discussed above in parallel as shown in FIG. 11.

<3. Third Embodiment>

[Camera 30]

Figure 15:
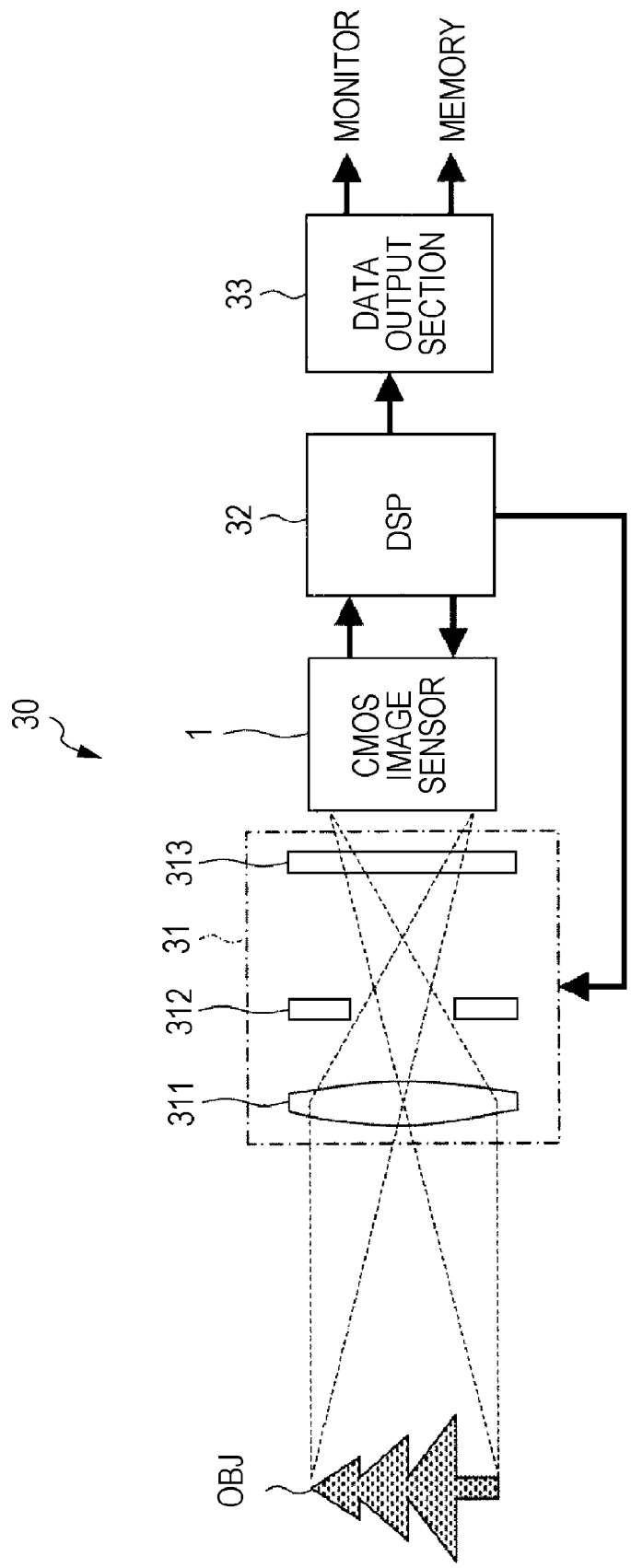
FIG. 15 is a schematic block diagram showing an exemplary configuration of a camera according to a third embodiment of the present invention.

The CMOS image sensor 1 discussed in relation to the first embodiment may be installed in a camera as illustrated in FIG. 15. Alternatively, the CMOS image sensor 1a discussed in relation to the second embodiment may be installed in the camera.

FIG. 15 is a schematic block diagram showing an exemplary configuration of a camera according to a third embodiment of the present invention.

In FIG. 15, only the main part of the camera is shown. As shown in FIG. 15, a camera 30 includes a CMOS image sensor 1, an optical system 31 for introducing incident light, an image processing apparatus 32 (DSP) as a signal processing section, and a data output section 33.

The optical system 31 includes a lens 311 for directing incident light (image light) onto a pixel region (pixel section 10), a diaphragm 312 for adjusting the amount of the light, and a low-pass filter 313 allowing only components of the incident light at a specific frequency to pass through.

The image processing apparatus 32 includes a DSP (Digital Signal Processor) and a memory, for example.

The image processing apparatus 32 applies predetermined image processing such as color interpolation, γ correction, RGB conversion, and YUV conversion to a digital signal input from the output circuit 20 of the CMOS image sensor 1. The image processing apparatus 32 outputs the digital signal subjected to the image processing to the data output section 33 as image data.

Besides, the image processing apparatus 32 controls exposure for the optical system 31, and controls the CMOS image sensor 1 in accordance with the reset timing etc.

The data output section 33 receives the image data subjected to the image processing as an input from the image processing apparatus 32, and outputs the image data to a monitor or a memory, for example.

The camera 30 operates as follows.

Incident light from a subject OBJ is directed through the lens 311 to be introduced onto the pixel section 10 of the CMOS image sensor 1.

The amount of the incident light is adjusted by the diaphragm 312, and only components of the incident light at a predetermined frequency are allowed to pass through the low-pass filter 313.

The CMOS image sensor 1 converts the incident light into signal charges as an analog signal, converts the analog signal into a digital signal, and outputs the digital signal to the image processing apparatus 32. The image processing apparatus 32 performs predetermined processing on the digital signal to output the digital signal to the data output section 33 as image data.

Also according to the camera 30 discussed above, it is possible to achieve a higher pixel resolution and a higher frame rate.

The present invention is not limited to the embodiments discussed above, and may be modified in various ways without departing from the scope and spirit of the present invention by those skilled in the art.

For example, the column processing circuit 17 may be configured in any way as long as it is capable of converting an analog signal read from the pixel section 10 into a digital signal.

The connection switch 151 of the switch section 15 may be suitably formed using a gate circuit or the like as long as it is capable of controlling input of an analog signal to the holding circuit 161.

The present application contains subject matter related to that disclosed in Japanese Priority Patent Application JP 2008-283966 filed in the Japan Patent Office on Nov. 5, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging element comprising:
a pixel section in which a plurality of pixels are arranged in a matrix, each of the pixels having a photoelectric conversion element;
a signal line configured to transmit signals read from the pixels;
a holding section configured to hold the signals read from the pixels in the signal line during a holding period;
a processing section configured to perform signal processing on the signals after the holding period; and
a control section configured to perform (i) a first control process in which a first signal is transmitted to the holding section via the signal line and held by the holding section during the holding period, (ii) a second control process in which the processing section performs the signal processing on the first signal and a second signal is read from the pixels and output via the signal line, (iii) a third control process in which the second signal is supplied to the holding section and held by the holding section during the holding period, and (iv) a fourth control process in which the processing section performs the signal processing on the second signal and the first signal is read from the pixels and output via the signal line, the third and fourth control processes performed concurrently by the control section.

2. The imaging element according to claim 1, wherein:
each of the pixels include an output node configured to output a charge obtained through photoelectric conversion performed by the photoelectric conversion element;
the control section is configured to read and output to the signal line (i) the first signal according to a voltage of the output node when the output node is reset to a predetermined voltage, and (ii) the second signal according to the charge of the signal output from the photoelectric conversion element to the output node; and
the control section is configured to concurrently perform the first control process and the second control process, the first control process performed during the holding period, the second control process performed after the holding period.

3. The imaging element according to claim 2, wherein the third control process is performed during the holding period, and the fourth control process is performed after the holding period.

4. The imaging element according to claim 3, wherein the processing section is configured to calculate a difference between the first signal after the signal processing of the second control process and the second signal after the signal processing of the fourth control process.

5. The imaging element according to claim 4, wherein the processing section includes (i) a comparison section configured to make a first comparison between a reference signal and the first signal and a second comparison between the reference signal and the second signal, and (ii) a counter configured to calculate a difference between a first count value based on a result of the first comparison and a second count value based on a result of the second comparison.

6. The imaging element according to any one of claims 1 to 5, further comprising:
a drive section configured to drive the pixels of the pixel section row by row.

7. The imaging element according to claim 1, wherein the holding period extends until a holding voltage obtained during the holding period reaches a voltage of the first signal or the second signal, and the holding section is configured to output the holding voltage to the processing section as the first signal or the second signal after the holding period.

8. A drive method for an imaging element comprising the steps of:
reading a signal from pixels of a pixel section, the pixels arranged in a matrix, each of the pixels having a photoelectric conversion element;
supplying the signal read from the pixels to a holding section through a signal line and holding the signal in the holding section during a holding period, the supplying of the signal to the holding section and the holding of the signal performed during a first control process of a control section;
stopping supply of the signal to the holding section, performing signal processing on the signal after the holding period, and reading another signal from the pixels of the pixel section during a second control process of the control section;
supplying the another signal from the pixels to the holding section through the signal line and holding the another signal in the holding section during the holding period, the supplying of the another signal to the holding section and the holding of the another signal performed during a third control process of the control section; and
performing signal processing on the another signal during a fourth control process of the control section, the fourth control process including the reading of the signal from the pixels and output of the signal via the signal line,
wherein,
the third and fourth control processes are performed concurrently by the control section.

9. The drive method according to claim 8, wherein the holding period extends until a holding voltage obtained during the holding period reaches a voltage of the signal or the another signal.

10. The drive method according to claim 9, further comprising:
outputting the holding voltage to the processing section after the another period.

11. A camera comprising:
an imaging element;
an optical system configured to introduce incident light to a pixel section of the imaging element; and
a signal processing section configured to process a signal output from the imaging element, the imaging element device including, (i) a plurality of pixels in the pixel section arranged in a matrix, each of the plurality of pixels having a photoelectric conversion element, (ii) a signal line configured to transmit signals read from the pixels, (iii) a holding section configured to hold the signals read from the pixels in the signal line during a holding period, (iv) a processing section configured to perform signal processing on the signals after the holding period, and (v) a control section configured to perform (i) a first control process in which a first signal is transmitted to the holding section via the signal line and held by the holding section during the holding period, (ii) a second control process in which the processing section performs the signal processing on the first signal and a second signal is read from the pixels and output via the signal line, (iii) a third control process in which the second signal is supplied to the holding section and held by the holding section during the holding period, and (iv) a fourth control process in which the processing section performs the signal processing on the second signal and the first signal is read from the pixels and output via the signal line, the third and fourth control processes performed concurrently by the control section.

12. The camera according to claim 11, wherein the holding period extends until a holding voltage obtained during the holding period reaches a voltage of the first signal or the second signal.

13. The camera according to claim 11, wherein the holding section is configured to output the holding voltage to the processing section as the first signal or the second signal after the holding period.

* * * * *